United States Patent
Hogger et al.

(10) Patent No.: US 11,045,984 B2
(45) Date of Patent: Jun. 29, 2021

(54) METHOD FOR PRODUCING A SHAPED BAR FROM FIBER COMPOSITE MATERIAL

(71) Applicant: Bayerische Motoren Werke Aktiengesellschaft, Munich (DE)

(72) Inventors: Thomas Hogger, Otterfing (DE); Oleg Konrad, Ergolding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 252 days.

(21) Appl. No.: 16/028,766

(22) Filed: Jul. 6, 2018

(65) Prior Publication Data

US 2018/0311872 A1 Nov. 1, 2018

Related U.S. Application Data

(63) Continuation-in-part of application No. PCT/EP2017/051297, filed on Jan. 23, 2017.

(30) Foreign Application Priority Data

Feb. 17, 2016 (DE) ..................... 10 2016 202 429.9

(51) Int. Cl.
| | |
|---|---|
| B29C 45/14 | (2006.01) |
| B29C 70/38 | (2006.01) |
| B29C 45/00 | (2006.01) |
| B29C 70/20 | (2006.01) |
| B29K 307/04 | (2006.01) |

(52) U.S. Cl.
CPC .... *B29C 45/14008* (2013.01); *B29C 45/0005* (2013.01); *B29C 45/14221* (2013.01); *B29C 45/14786* (2013.01); *B29C 70/205* (2013.01); *B29C 70/386* (2013.01);
(Continued)

(58) Field of Classification Search
CPC ..................... B29C 45/14008; B29C 45/0005
See application file for complete search history.

(56) References Cited

U.S. PATENT DOCUMENTS

| | | | | |
|---|---|---|---|---|
| 5,624,386 A | * | 4/1997 | Tailor ........................ | A61F 5/01 428/110 |
| 2012/0279649 A1 | | 11/2012 | Lemckau et al. | |
| 2013/0228285 A1 | * | 9/2013 | Pause ...................... | B29C 70/38 156/360 |

FOREIGN PATENT DOCUMENTS

| | | |
|---|---|---|
| CN | 1297400 A | 5/2001 |
| CN | 104512039 A | 4/2015 |

(Continued)

OTHER PUBLICATIONS

International Search Report (PCT/ISA/210) issued in PCT Application No. PCT/EP2017/051297 dated Apr. 10, 2017 with English translation (seven pages).

(Continued)

*Primary Examiner* — Nathan T Leong
(74) *Attorney, Agent, or Firm* — Crowell & Moring LLP

(57) ABSTRACT

A method for producing a shaped bar from fiber composite material uses a bonding tool which has a heating-up portion. The method includes the steps that a number of fiber tapes provided with a thermoplastic matrix are fed in parallel to the bonding tool, are brought together and heated and bonded in the heating-up portion to form a fiber cord. The fiber cord is subsequently placed by the bonding tool directly into a processing tool or a depositing device designed to place the fiber cord into the processing tool.

5 Claims, 4 Drawing Sheets

(52) U.S. Cl.
CPC ...... *B29K 2307/04* (2013.01); *B29K 2313/00* (2013.01); *B29K 2905/02* (2013.01)

(56) References Cited

FOREIGN PATENT DOCUMENTS

| DE | 10 2004 007 313 A1 | 9/2005 | |
|----|--------------------|--------|----|
| DE | 10 2009 060 696 A1 | 6/2011 | |
| DE | 10 2010 012 719 A1 | 9/2011 | |
| DE | 10 2010 044 175 A1 | 5/2012 | |
| DE | 10 2010 063 751 A1 | 6/2012 | |
| WO | WO99052703 | * | 10/1999 |

OTHER PUBLICATIONS

German-language Written Opinion (PCT/ISA/237) issued in PCT Application No. PCT/EP2017/051297 dated Apr. 10, 2017 (seven pages).

German-language Search Report issued in counterpart German Application No. 10 2016 202 429.9 dated Jun. 9, 2016 with partial English translation (11 pages).

Campbell, "Chapter 10, Thermoplastic Composites: An Unfulfilled Promise", Manufacturing processes for advanced composites, Jan. 1, 2004, pp. 357-397, Elsevier Advanced Technology, Oxford, GB, XP-002615944.

Campbell, Manufacturing Processes for Advanced Composites, Dec. 30, 2004, pp. 144-148, XP055360300.

Wobbe et al. "Kombinationstechnologien auf Basis des Spritzgiessverfahrens", Jan. 1, 2016, 314 pages, XP055360392.

English translation of Chinese Office Action issued in counterpart Chinese Application No. 201780003776.0 dated Aug. 26, 2019 (seven (7) pages).

Chinese-language Office Action issued in Chinese Application No. 201780003776.0 dated Apr. 27, 2020 with English translation (19 pages).

* cited by examiner ns of a method for producing a shaped bar

METHOD FOR PRODUCING A SHAPED BAR FROM FIBER COMPOSITE MATERIAL

CROSS REFERENCE TO RELATED APPLICATIONS

This application is a continuation-in-part of PCT International Application No. PCT/EP2017/051297, filed Jan. 23, 2017, which claims priority under 35 U.S.C. § 119 from German Patent Application No. 10 2016 202 429.9, filed Feb. 17, 2016, the entire disclosures of which are herein expressly incorporated by reference.

BACKGROUND AND SUMMARY OF THE INVENTION

The invention relates to a method for producing a shaped bar from fiber composite material, preferably by using an industrial robot.

Fiber-reinforced plastics possess a high potential for lightweight construction and are capable, in comparison with other materials such as metals or unreinforced plastics, of absorbing high tensile forces through the incorporated fibers. As a result, the weight-specific advantages of fiber-reinforced plastics are used to the best advantage when the fibers are laid in the matrix material in keeping with the load path, which requires a construction of the material that is appropriate for the load. This has been achieved until now only in the most rudimentary form in the automotive manufacturing sector.

It is already known in the prior art to produce straight bars from fiber composite material, for example by means of thermoplastic pultrusion. However, the method can be mastered only with difficulty. In addition, the manufacturing plants are very large, expensive and inflexible with respect to the producible component shapes.

The invention thus has as its object to make available a method by which bars can be produced from fiber composite material more cost-effectively and with greater variability in respect of their design.

This and other objects are achieved according to the invention by a method for producing a shaped bar from fiber composite material using a bonding tool. The method comprises at least the steps that a number of fiber tapes provided with a thermoplastic matrix are fed in parallel to the bonding tool, are brought together and are heated and bonded in the heating-up section of the bonding tool to form a fiber cord, wherein the fiber cord is subsequently deposited by the bonding tool directly and without cooling into a processing tool or a depositing device designed to place the fiber cord into the processing tool.

The bonding tool is preferably formed by an industrial robot or is carried thereby.

Other objects, advantages and novel features of the present invention will become apparent from the following detailed description of one or more preferred embodiments when considered in conjunction with the accompanying drawings.

DETAILED DESCRIPTION OF THE DRAWING

Figure 1:
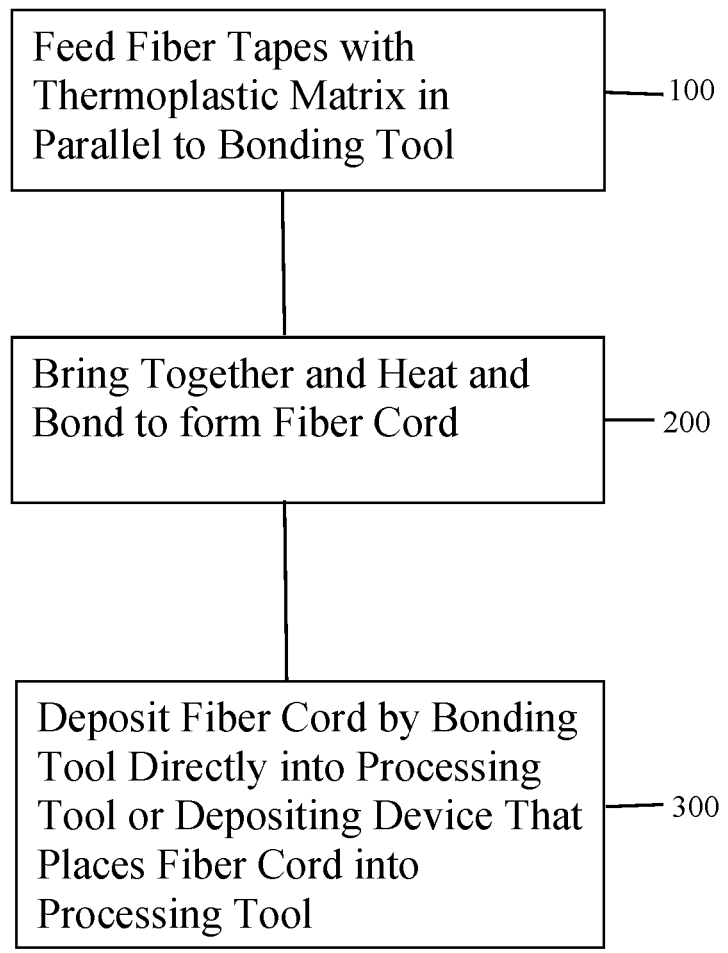
FIG. 1 is a flow chart illustrating an exemplary method according to the invention for producing a shaped bar from fiber composite material using a bonding tool.

Referring to FIG. 1, a method is provided for producing a shaped bar from fiber composite material using a bonding tool. The bonding tool has a heating-up section. The method includes a first step wherein a number of fiber tapes provided with a thermoplastic matrix are fed in parallel to the bonding tool (step 100). Next, the fiber tapes are brought together and are heated and bonded in the heating-up section to form a fiber cord (step 200). The fiber cord is subsequently deposited by the bonding tool directly into a processing tool or into a depositing device which itself is configured to place the fiber cord into the processing tool (step 300).

In an advantageous embodiment, a multi-axis robot is used as an industrial robot, which can be equipped with a robot head. The machine sections necessary for the implementation of the process can be integrated into the robot head, wherein, in this respect in particular, a drive for feeding and conveying the fiber tape having the thermoplastic matrix, a device for bringing together and bundling the fiber tape, a heating line for heating the combined fiber tapes in the heating section, and a discharge point for depositing the produced fiber cord are present. Both the drive and the device for bringing together and bundling the fiber tape can be provided in the form of interacting rolls or rollers. The impregnated fiber tapes are supplied to the industrial robot as a starting material wound on reels or spools.

The use of a multi-axis industrial robot enables the fiber cords to be deposited in any desired forms and in any desired positions. It also allows the number of fiber tapes and fiber cords, and consequently the reinforcement characteristic, to be variably adjusted. A number of fiber tapes are preferably fed in parallel.

Figure 2:
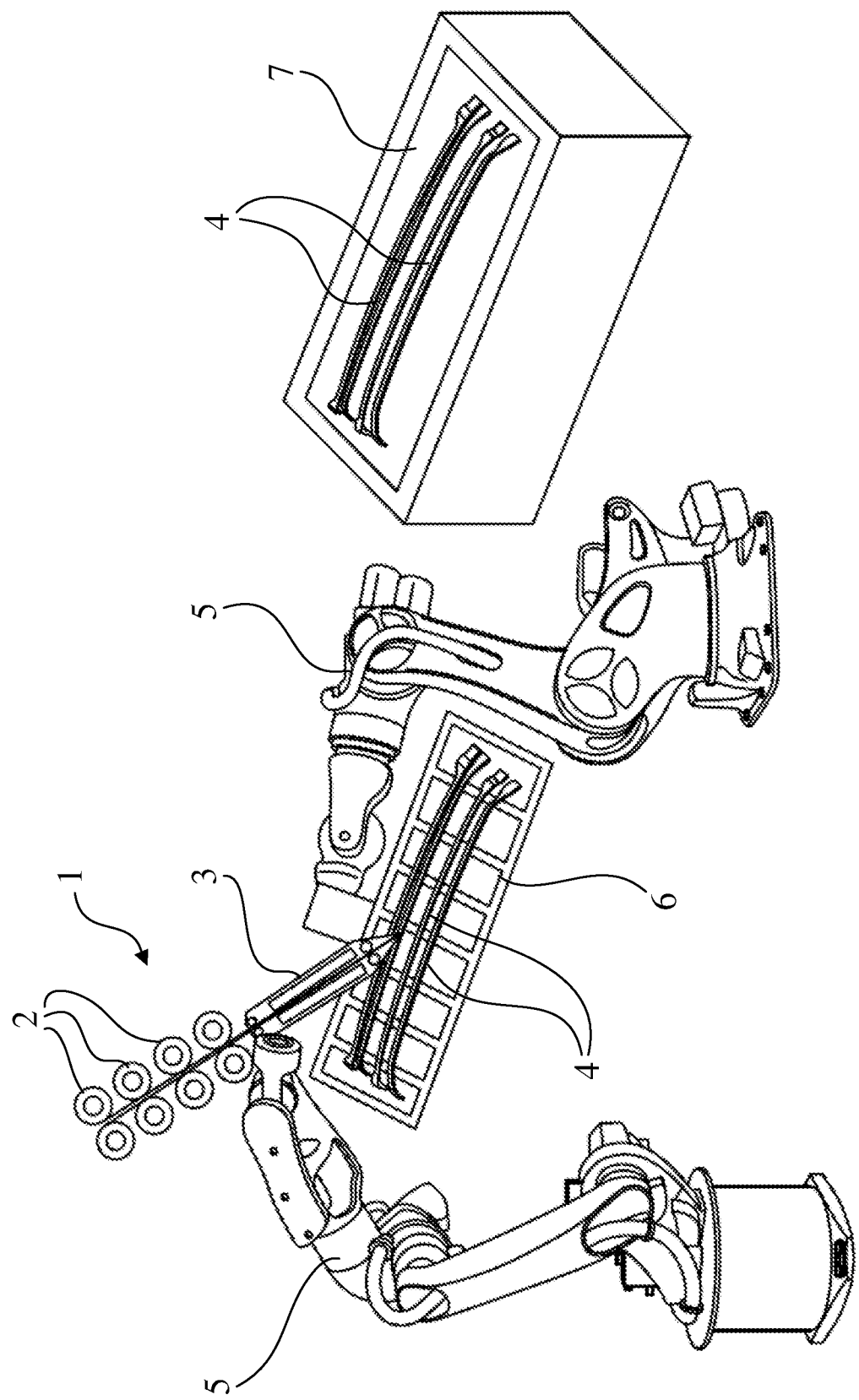
FIG. 2 is a schematic drawing illustrating an exemplary embodiment of a method for producing a shaped bar from fiber composite material.

FIG. 2 shows a method for producing a shaped bar from fiber composite material according to an exemplary embodiment. Referring to FIG. 2, a bonding tool 1 is carried by an industrial robot 5 that is configured as a multi-axis robot. The bonding tool 1 comprises a number of tape reels carrying fiber tapes 2 as well as a heating-up section 3. The fiber tapes 2 are fed in parallel to the heating-up section 3, where they are brought together, heated and bonded to form a fiber cord 4. The fiber cord 4 is then deposited into a depositing device 6 that is also carried by an industrial robot 5 and that is configured to place the fiber cord 4 into a processing tool 7. The processing tool 7 can be a forming tool, for example. Alternatively, the fiber cord 4 can be deposited directly into the processing tool 7 by the bonding tool 1.

Figure 3:
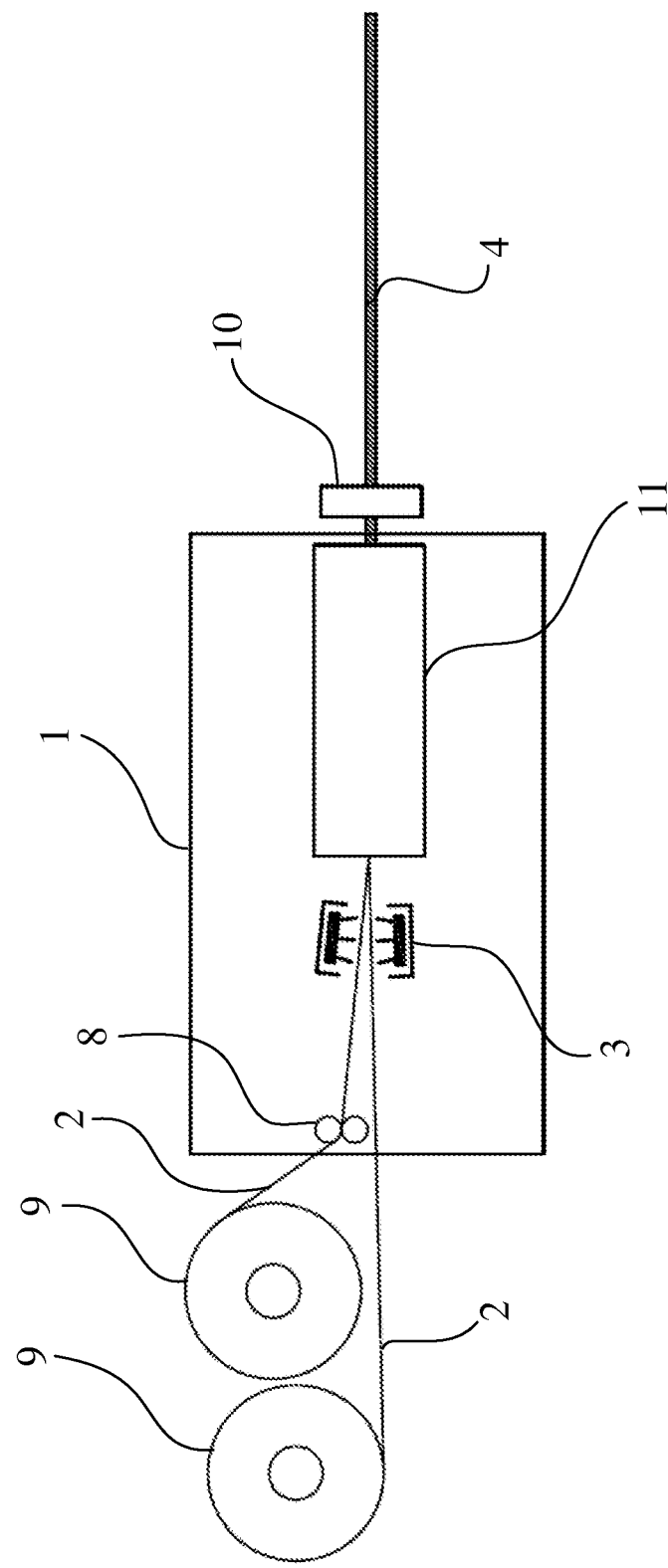
FIG. 3 is a schematic diagram illustrating another exemplary embodiment of a method for producing a shaped bar from fiber composite material.

FIG. 3 shows a method for producing a shaped bar from fiber composite material according to another exemplary embodiment. In FIG. 3, two fiber tapes 2 are fed from tape reels 9 to a bonding tool 1 comprising deflector rolls 8, a heating-up section 3 and a squeezing unit 11. By using the deflector rolls 8, the fiber tapes 2 are brought together, are then heated by the heating-up section 3 which is configured as a controlled infrared-field, and then bonded by the squeezing unit 11 to form a fiber cord 4. Furthermore, the fiber cord 4 is cut by a cutting unit 10. Subsequently, the fiber cord 4 is deposited by the bonding tool, directly into a processing tool or into a depositing device configured to place the fiber cord into the processing tool (not shown).

Figure 4:
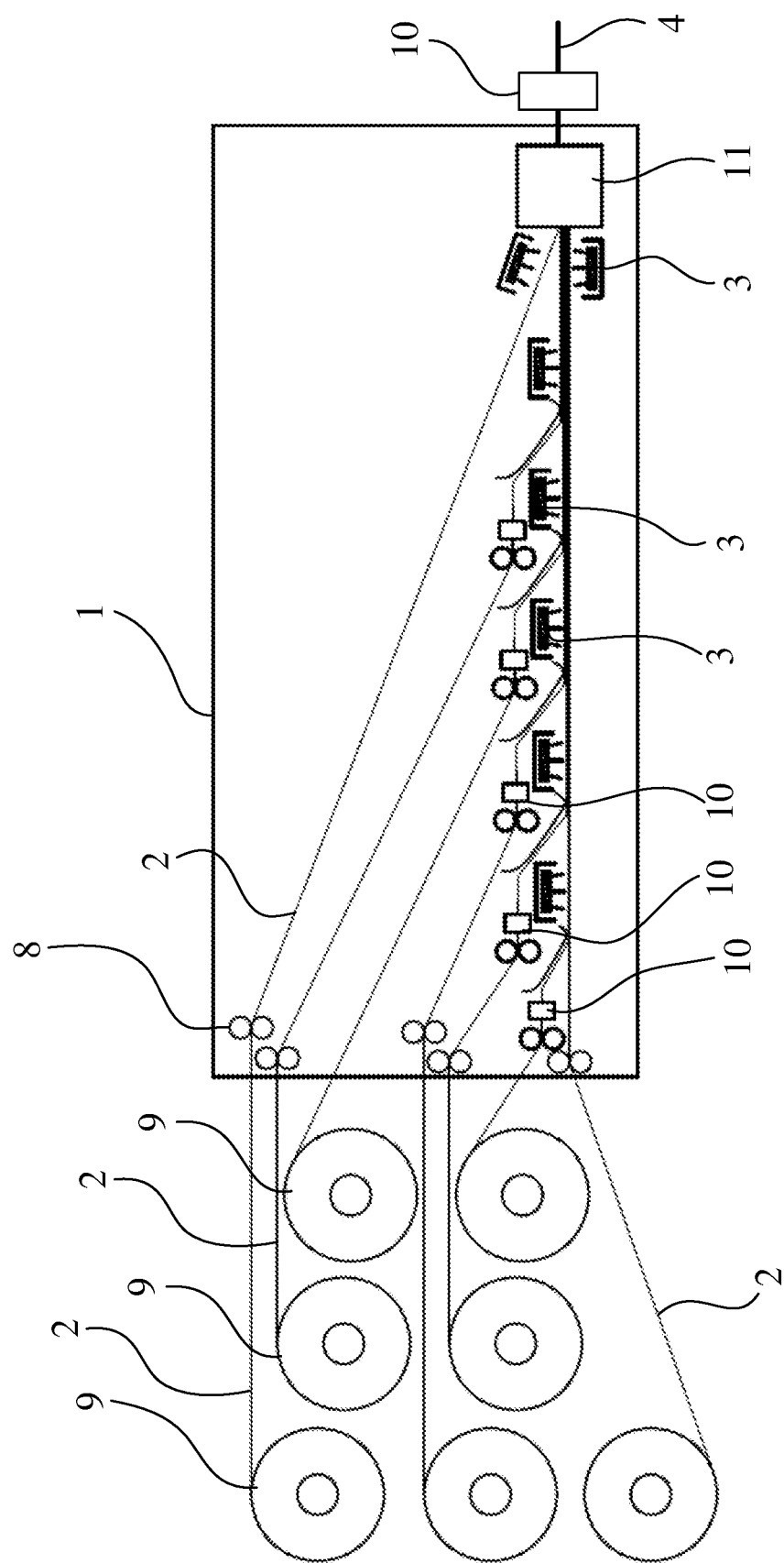
FIG. 4 is a yet another exemplary embodiment illustrating a method for producing a shaped bar from fiber composite material.

FIG. 4 shows a method for producing a shaped bar from fiber composite material according to another exemplary embodiment. In contrast to the exemplary embodiment according to FIG. 3, in FIG. 4 a greater number of fiber tapes 2 carried on tape reels 9 is fed to the bonding tool 1. The cross section of the respective fiber cord 4 can be determined by the number of fiber tapes. In particular, by using one or more of the different cutting units 10, the resulting cross section of the individual fiber cords 4 being produced can be varied.

In a favorable variant embodiment, the fiber tapes are formed from carbon fibers. They exhibit a thickness of 0.1 to 0.3 mm. The fiber tapes are preferably of unidirectional configuration.

The inventive method also makes it possible for a number of fiber cords to be deposited on top of each other by the industrial robot. The material strength of the bar to be produced can be controlled by the number of fiber cords. The industrial robot is capable of being programmed in this context to deposit a number of identical fiber cords one on top of the other along the predetermined distance, in order to adjust the bar thickness. The fiber cords are combined or adhere to one another via their respective thermoplastic matrix.

It is also advantageous, as a further alternative embodiment of the method, for the number of supplied fiber tapes to be variable. The cross section of the respective fiber cord can be determined by the number of fiber tapes.

According to a first aspect of the present invention, it is proposed that the processing tool is a forming tool. The fiber cords are then capable of being deposited into the forming tool in any desired form and with high accuracy, wherein the fiber cords are subsequently bought into their desired final form by the forming tool. This variant can also be used for the three-dimensional forming of the bars to be produced. Following forming, the formed fiber cord or the stack of fiber cords is extrusion-coated with plastic. As an alternative hereto, the fiber cord produced by the bonding tool can be deposited into a depositing device, wherein the depositing device can subsequently be placed into the forming tool for forming of the fiber cord into its final form. The use of a depositing device, for example in the form of an aluminum mold, permits curved forming of the fiber cord by a displacement of the depositing device in space, wherein the fiber cord emerges substantially straight from the bonding tool. The displacement in space is achievable by a robot, since the depositing device is very light in weight, unlike the forming tool.

The inventive formed bars are used in automobile engineering inter alia as a carrier material for the stabilization of plastic components, for example in a roof bow.

According to a second aspect of the present invention, it is proposed that the processing tool is an injection molding tool and that the fiber cord or the fiber cords are deposited directly into the injection molding tool or into its mold.

According to the invention, the use of the industrial robot enables the fiber cord to be deposited in a curved form, and in particular also in a three-dimensionally curved form. The components that are capable of being produced thereby, in comparison with the conventional pultrusion process, accordingly exhibit greater variability in respect of their design and hence an increased range of application.

In an advantageous variant embodiment of the method, it is proposed that the fiber cord is deposited into the injection molding tool in a final form of the shaped bar to be produced and is extrusion-coated immediately with plastic. The industrial robot in this case works directly in the injection molding machine and places the fiber cords into the predetermined mold inside the injection-molding machine. As soon as depositing of the fiber cord has been completed, the injection molding machine can be closed and plastic can be injected around the bar or the bars. The waiting times and tool down times are very short. The rate of production is increased considerably and the costs are reduced.

In a further development of the method, it is proposed that a number of fiber cords are deposited in their respective final form into the injection molding tool, wherein the multiple fiber cords together form a component structure of a component to be produced and are extrusion-coated immediately with plastic.

An embodiment of the method, in which the fiber cords are deposited in a lattice structure, is also advantageous. The lattice structure can subsequently be extrusion-coated in the plastic injection molding process. The use of a lattice structure permits a number of load paths in the component to be formed in a variety of ways.

The invention is not restricted in its implementation to the above-mentioned preferred illustrative embodiments. A number of variants, which make use of the illustrated solution, including in fundamentally different embodiments, are contemplated instead. For example, fiber materials other than carbon fibers can be processed. For example, a polyamide matrix can be used as the thermoplastic matrix.

REFERENCE CHARACTER LIST 1 bonding tool
2 fiber tapes
3 heating-up section
4 fiber cord
5 multi-axis industrial robot
6 depositing device
7 processing tool
8 deflector roll
9 tape reel
10 cutting unit
11 squeezing unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a shaped bar from fiber composite material by using a bonding tool, which has a heating-up section, the method comprising the steps of:
   feeding a number of fiber tapes provided with a thermoplastic matrix in parallel to the bonding tool;
   bringing the fed fiber tapes together and heating and bonding them in the heating-up section of the bonding tool to form a fiber cord;
   subsequently depositing the formed fiber cord, by the bonding tool, directly into a processing tool or into a depositing device that then places the formed fiber cord into the processing tool, wherein the processing tool is a forming tool; and
   forming the formed fiber cord into a three-dimensional shape by the forming tool,
   wherein the bonding tool is formed by a multi-axis industrial robot, wherein a drive for feeding and conveying the fiber tapes, a device for bringing together and bundling the fiber tapes, a heating line for heating the fiber tapes in the heating-up section, and a discharge point for depositing the formed fiber cord are integrated in a head of the industrial robot, wherein tape reels carrying the fiber tapes are included in the multi-axis industrial robot, and wherein the formed fiber cord can be deposited in any desired shape and in any desired position by the multi-axis industrial robot.

2. The method as claimed in claim 1, wherein a number of fiber cords are deposited successively on top of each other by the industrial robot.

3. The method as claimed in claim 1, wherein the number of fed fiber tapes determines a cross section of the fiber cord.

4. The method as claimed in claim 1, wherein following the forming by the forming tool the fiber cord is then extrusion-coated immediately with plastic.

5. The method as claimed in claim 1, wherein the fiber cords are deposited in a lattice structure.

* * * * *